United States Patent
Tsunashima et al.

(10) Patent No.: US 12,457,927 B2
(45) Date of Patent: Nov. 4, 2025

(54) ELECTRIC WORK VEHICLE DRIVE ARRANGEMENT

(71) Applicant: ISEKI & CO., LTD., Matsuyama (JP)

(72) Inventors: Taro Tsunashima, Tobe-cho (JP);
Ryutaro Masuda, Tobe-cho (JP);
Yusuke Baba, Tobe-cho (JP)

(73) Assignee: ISEKI & CO., LTD., Matsuyama (JP)

( * ) Notice: Subject to any disclaimer, the term of this patent is extended or adjusted under 35 U.S.C. 154(b) by 651 days.

(21) Appl. No.: 17/820,158

(22) Filed: Aug. 16, 2022

(65) Prior Publication Data
US 2023/0055171 A1    Feb. 23, 2023

(51) Int. Cl.
| | | |
|---|---|---|
| A01D 34/78 | (2006.01) | |
| A01D 34/64 | (2006.01) | |
| A01D 43/063 | (2006.01) | |
| A01D 69/02 | (2006.01) | |
| A01D 101/00 | (2006.01) | |

(52) U.S. Cl.
CPC ............. *A01D 34/64* (2013.01); *A01D 34/78* (2013.01); *A01D 43/063* (2013.01); *A01D 2101/00* (2013.01)

(58) Field of Classification Search
CPC ........ A01D 34/63; A01D 34/66; A01D 34/71; A01D 34/78; A01D 34/64; A01D 43/06–0638; A01D 69/02
See application file for complete search history.

(56) References Cited

U.S. PATENT DOCUMENTS

| | | | | |
|---|---|---|---|---|
| 6,484,486 | B2* | 11/2002 | Nagai | A01D 43/0635 56/16.8 |
| 6,584,757 | B2* | 7/2003 | Komorida | A01D 43/0635 56/11.3 |
| 8,207,693 | B2* | 6/2012 | Hauser | B60L 15/2036 361/784 |
| 10,149,432 | B2* | 12/2018 | Tanabe | A01D 34/64 |
| 11,486,420 | B2* | 11/2022 | Uemura | F15B 13/08 |
| 11,632,906 | B2* | 4/2023 | Ito | A01D 69/02 56/12.3 |
| 2005/0284685 | A1* | 12/2005 | Oshima | B60K 17/04 180/305 |
| 2009/0000839 | A1* | 1/2009 | Ishii | B62D 11/04 701/41 |
| 2011/0155486 | A1* | 6/2011 | Iwaki | B60L 50/51 188/106 P |

(Continued)

FOREIGN PATENT DOCUMENTS

| | | | | |
|---|---|---|---|---|
| EP | 2172094 | A1 * | 4/2010 | A01D 34/66 |
| JP | 2003158907 | A | 6/2003 | |
| JP | 2020156340 | A | 10/2020 | |

*Primary Examiner* — Adam J Behrens
(74) *Attorney, Agent, or Firm* — Finnegan, Henderson, Farabow, Garrett & Dunner LLP

(57) ABSTRACT

A hood in which a predetermined space is formed is provided in a front portion of a traveling vehicle body, a control portion on which an operator rides is provided on a rear side of the hood, a first electric motor configured to drive rear wheels and a second electric motor configured to drive a work machine are provided on a lower rear side of a control seat of the control portion, and a battery configured to store electric power to be supplied to the first electric motor and the second electric motor is provided in the space formed by the hood.

3 Claims, 21 Drawing Sheets

(56) References Cited

U.S. PATENT DOCUMENTS

| | | | |
|---|---|---|---|
| 2011/0247886 A1* | 10/2011 | Sasahara | A01D 34/78 180/6.5 |
| 2019/0075724 A1* | 3/2019 | Becke | H02J 7/0048 |
| 2020/0208657 A1* | 7/2020 | Uemura | F15B 13/08 |
| 2024/0130289 A1* | 4/2024 | Sugimura | A01D 34/78 |

* cited by examiner

ELECTRIC WORK VEHICLE DRIVE ARRANGEMENT

CROSS REFERENCE TO RELATED APPLICATIONS

This application claims priority to Japanese Patent Application No. 2021-132620, filed Aug. 17, 2021; Japanese Patent Application No. 2021-132621, filed Aug. 17, 2021; and Japanese Patent Application No. 2021-167944, filed Oct. 13, 2021, the disclosures of which are incorporated herein by reference in their entirety.

BACKGROUND

Technical Field

The present invention relates to a work vehicle that travels in a park or the like and performs mowing of lawn or the like.

Description of Related Art

In the related art, in a work vehicle, a method is known in which an engine is mounted on a hood portion, and an output rotation of the engine is transmitted to rear wheels or a work machine such as a mower deck supported by a lower portion of the work vehicle so as to be movable up and down, thereby driving the work vehicle (see JP-A-2003-158907).

In addition, in a work vehicle, a method is known in which a battery is mounted on a rear portion of the work vehicle, electric power of the battery is supplied to an electric motor, and an output rotation of the electric motor is transmitted to rear wheels or a work machine such as a mower deck supported by a front portion of the work vehicle so as to be movable up and down, thereby driving the work vehicle (see JP-A-2020-156340).

However, in the method in JP-A-2003-158907, since the configuration of a transmission device that transmits the output rotation of the engine to the rear wheels or the work machine is complicated and the number of components is large, a weight of the work vehicle may be heavy.

Further, in the method in JP-A-2020-156340, since the battery is mounted on the rear portion of the work vehicle, a weight balance in a front-rear direction of the work vehicle may be deteriorated, and maneuverability may be deteriorated.

SUMMARY

Therefore, an object of the invention is to provide a work vehicle in which a weight of the work vehicle is reduced, and a weight balance in a front-rear direction of the work vehicle is improved, thereby improving maneuverability.

The invention that solves the above problems is as follows.

That is, the invention according to a first aspect is a work vehicle including: a pair of left and right front wheels (2) provided at a front portion of a traveling vehicle body (1); a pair of left and right rear wheels (3) provided at a rear portion of the traveling vehicle body (1); and a work machine (4) provided on a lower surface of the traveling vehicle body (1).

A hood (5) is provided at the front portion of the traveling vehicle body (1), and a control portion (6) on which an operator rides is provided at a rear side of the hood (5), a first electric motor (30) configured to drive the rear wheels (3) and a second electric motor (40) configured to drive the work machine (4) are provided on a lower rear side of a control seat (60) of the control portion (6), and a battery (50) configured to store electric power supplied to the first electric motor (30) and the second electric motor (40) is provided in a space formed by the hood (5).

The invention according to a second aspect is the work vehicle according to the first aspect, in which a first output shaft (30A) of the first electric motor (30) is provided along a left-right direction, and a second output shaft (40A) of the second electric motor (40) is provided along a front-rear direction.

The invention according to a third aspect is the work vehicle according to the second aspect, in which a gear box (31) configured to transmit an output rotation of the first output shaft (30A) to a lower drive shaft (33) is provided on one side of the first electric motor (30), the rear wheels (3) and the gear box (31) are coupled by the drive shaft (33) extending in the left-right direction, and the second electric motor (40) is provided below the first electric motor (30), and the second output shaft (40A) is provided above the drive shaft (33).

The invention according to a fourth aspect is the work vehicle according to the third aspect, in which the second electric motor (40) is provided below the first electric motor (30), and the second output shaft (40A) is provided above the drive shaft (33) so as to intersect with the drive shaft (33) in a plan view.

The invention according to a fifth aspect is the work vehicle according to any one of the first through fourth aspects, in which a grass collection container (7) configured to store weeds cut by the work machine (4) is provided on a rear side of the control portion (6), and an outlet port of the work machine (4) and an inlet port of the grass collection container (7) are communicated with each other by a chute (46), the first electric motor (30) and the second electric motor (40) are provided so as to be shifted to one side in a left-right direction, and the chute (46) is provided on the other side of the first electric motor (30) and the second electric motor (40).

According to some aspects of the invention, a hood (5) in which a predetermined space is formed is provided on a front side of an upper surface of a traveling vehicle body (1), a control portion (6) on which an operator rides is provided on a rear side of the hood (5), a first electric motor (30) configured to drive rear wheels (3) and a second electric motor (40) configured to drive a work machine (4) are provided on a lower rear side of a control seat (60) of the control portion (6), and a battery (50) configured to store electric power to be supplied to the first electric motor (30) and the second electric motor (40) is provided on the hood (5). Therefore, a weight balance of the traveling vehicle body (1) can be improved. The space formed in the hood (5) can be effectively utilized.

According to some aspects of the invention, the first output shaft (30A) of the first electric motor (30) is provided along the left-right direction, and the second output shaft (40A) of the second electric motor (40) is provided along the front-rear direction. The number of components of a transmission mechanism between the first electric motor (30) and the rear wheels (3) and a transmission mechanism of the second electric motor (40) and the work machine (4) can be reduced to further reduce a load applied to the traveling vehicle body (1).

According to some aspects of the invention, the gear box (31) for decelerating the output rotation of the first output shaft (30A) and switching a rotation direction is provided on one side of the first electric motor (30), the rear wheels (3) and the gear box (31) are coupled by the drive shaft (33) extending in the left-right direction, the first electric motor (30) is provided above the second electric motor (40), and the second output shaft (40A) is provided above the drive shaft (33). Therefore, a space formed below the first electric motor (30) can be effectively utilized.

According to some aspects of the invention, the second electric motor (40) is provided below the first electric motor (30), and the second output shaft (40A) is provided above the drive shaft (33) so as to intersect with the drive shaft (33) in the plan view. Therefore, a space formed below the first electric motor (30) can be effectively utilized.

According to some aspects of the invention, the first electric motor (30) and the second electric motor (40) are provided to be shifted to one side in the left-right direction, and the chute (46) is provided on the other side of the first electric motor (30) and the second electric motor (40). Therefore, a large chute (46) can be provided on an opposite side of the first electric motor (30) and the second electric motor (40).

DETAILED DESCRIPTION

Figure 1:
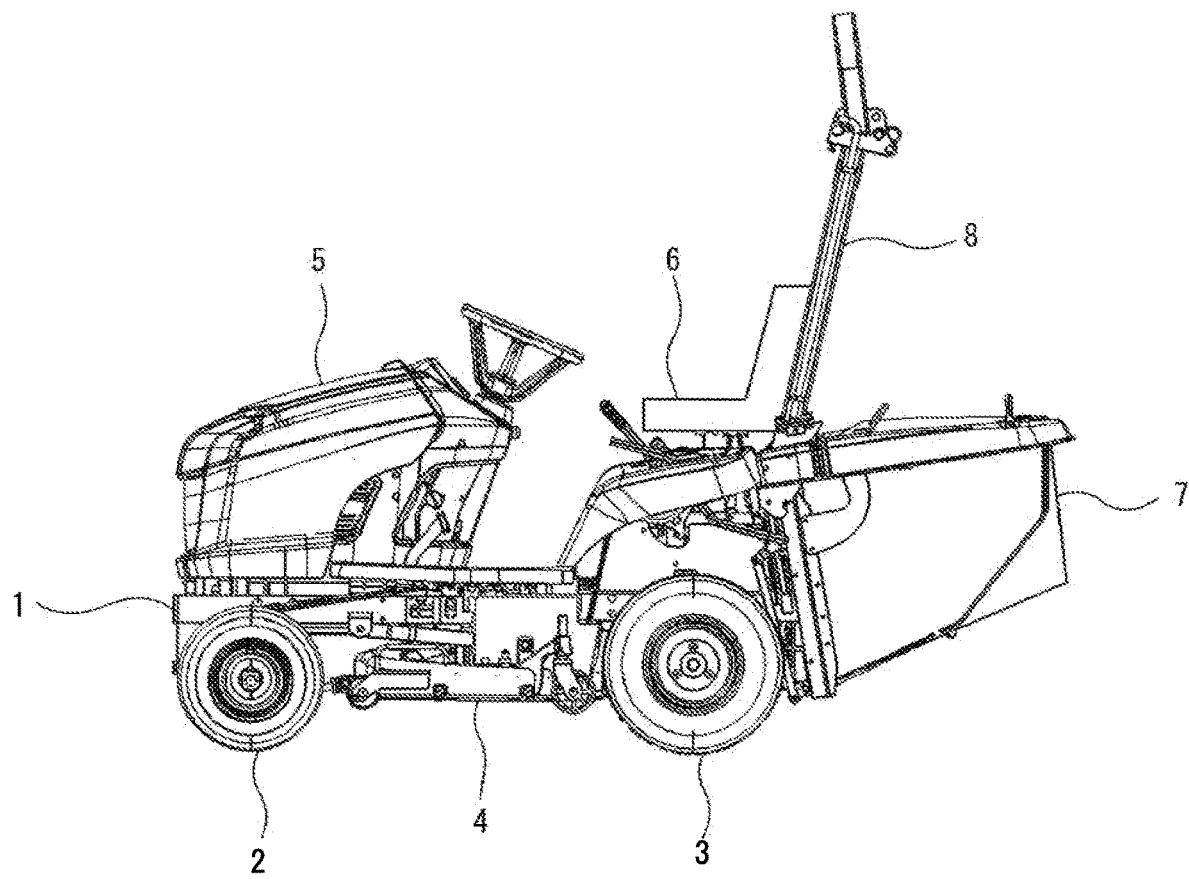
FIG. 1 is a left side view of a work vehicle.

As shown in FIG. 1, a work vehicle such as a riding lawn mower includes a traveling vehicle body 1, a pair of left and right front wheels 2 provided at a front portion of the traveling vehicle body 1, a pair of left and right rear wheels 3 provided at a rear portion of the traveling vehicle body 1, and a work machine 4 for mowing lawn or the like provided between the front wheels 2 and the rear wheels 3 on a lower side of the traveling vehicle body 1. Further, a hood 5 is provided at a front portion of an upper side of the traveling vehicle body 1, a control portion 6 on which an operator rides is provided at a rear side of the hood 5, a safety frame (ROPS) 8 for protecting the operator is provided at a rear side of the control portion 6, and a grass collection container 7 for storing lawn or the like mowed by the work machine 4 is provided at a lower portion of the safety frame 8.

Figure 2:
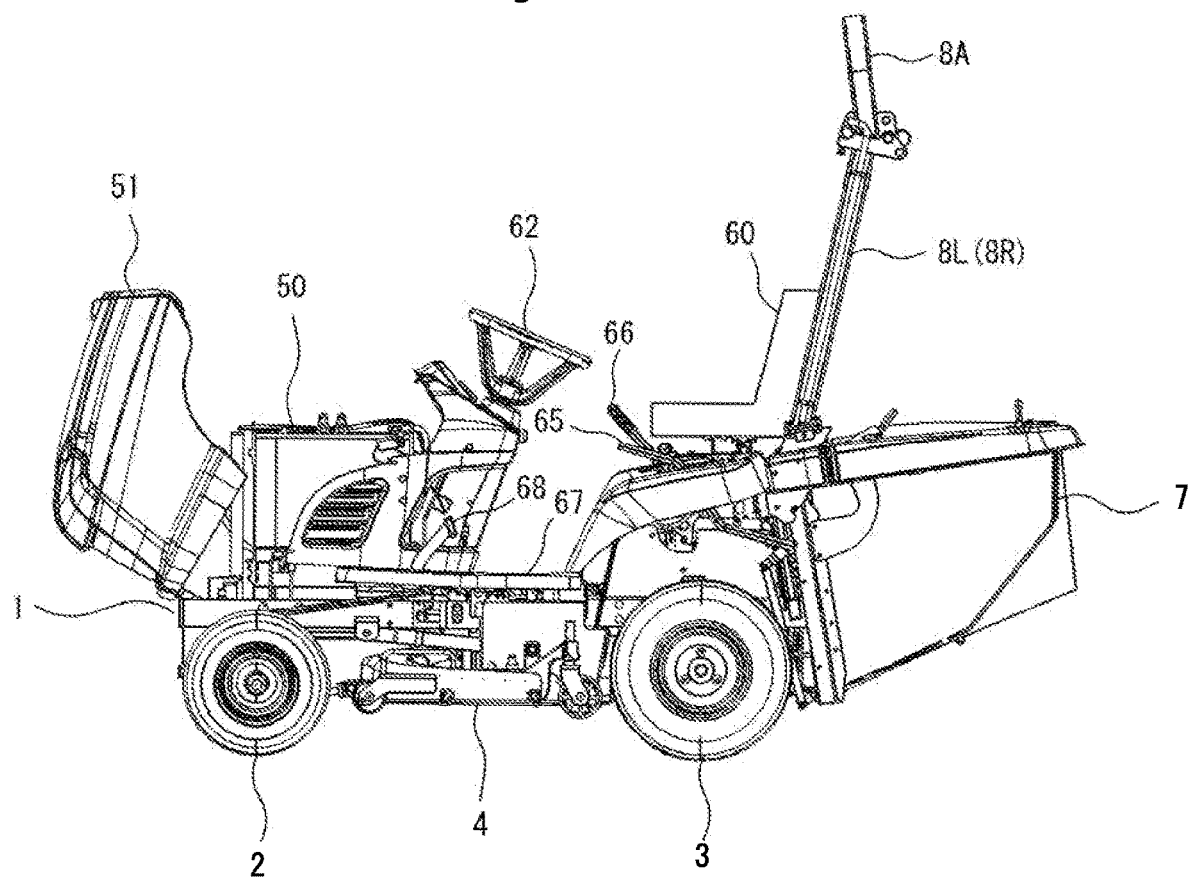
FIG. 2 is a left side view of the work vehicle in which a hood cover is in an open posture.
Figure 3:
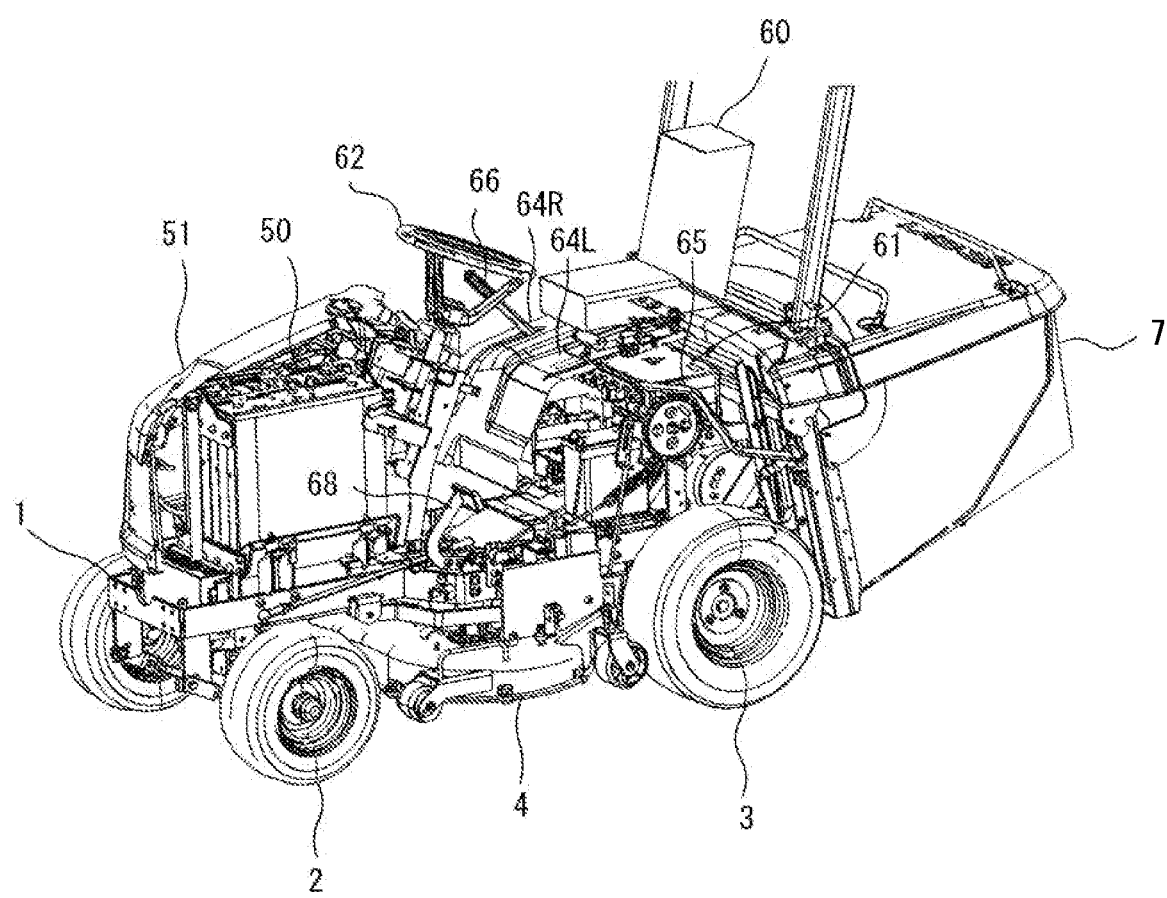
FIG. 3 is a perspective view of main parts of the work vehicle in which a part of the work vehicle is cut away.
Figure 4:
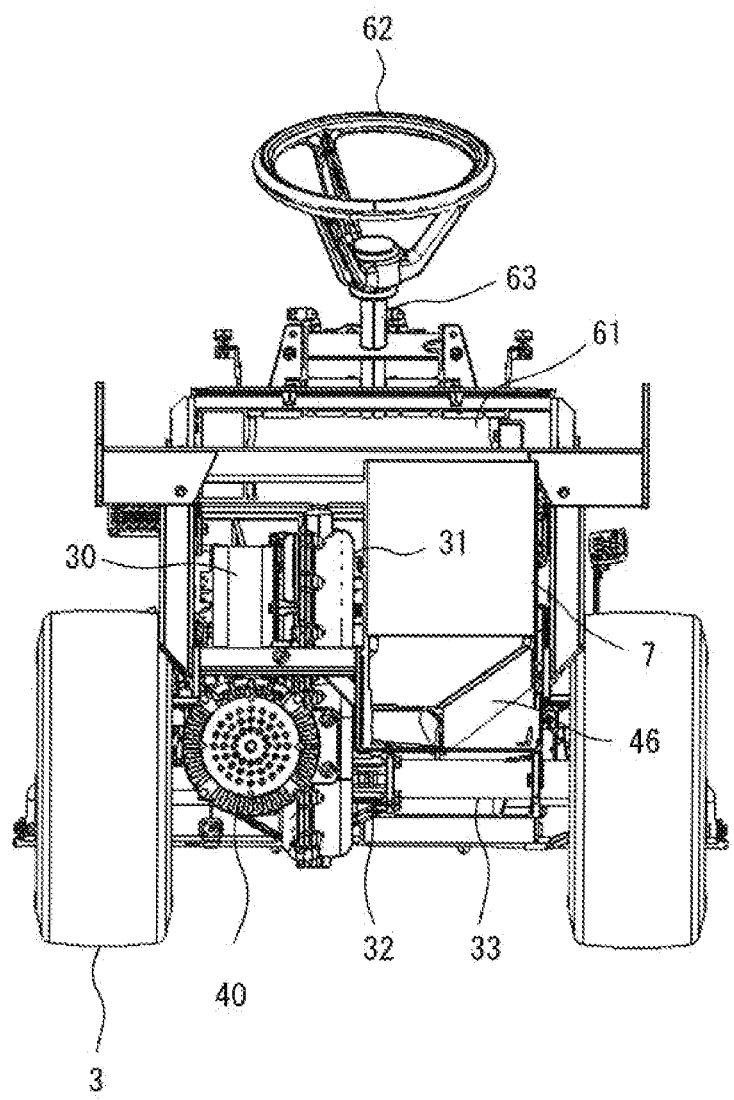
FIG. 4 is a rear view of the work vehicle.
Figure 5:
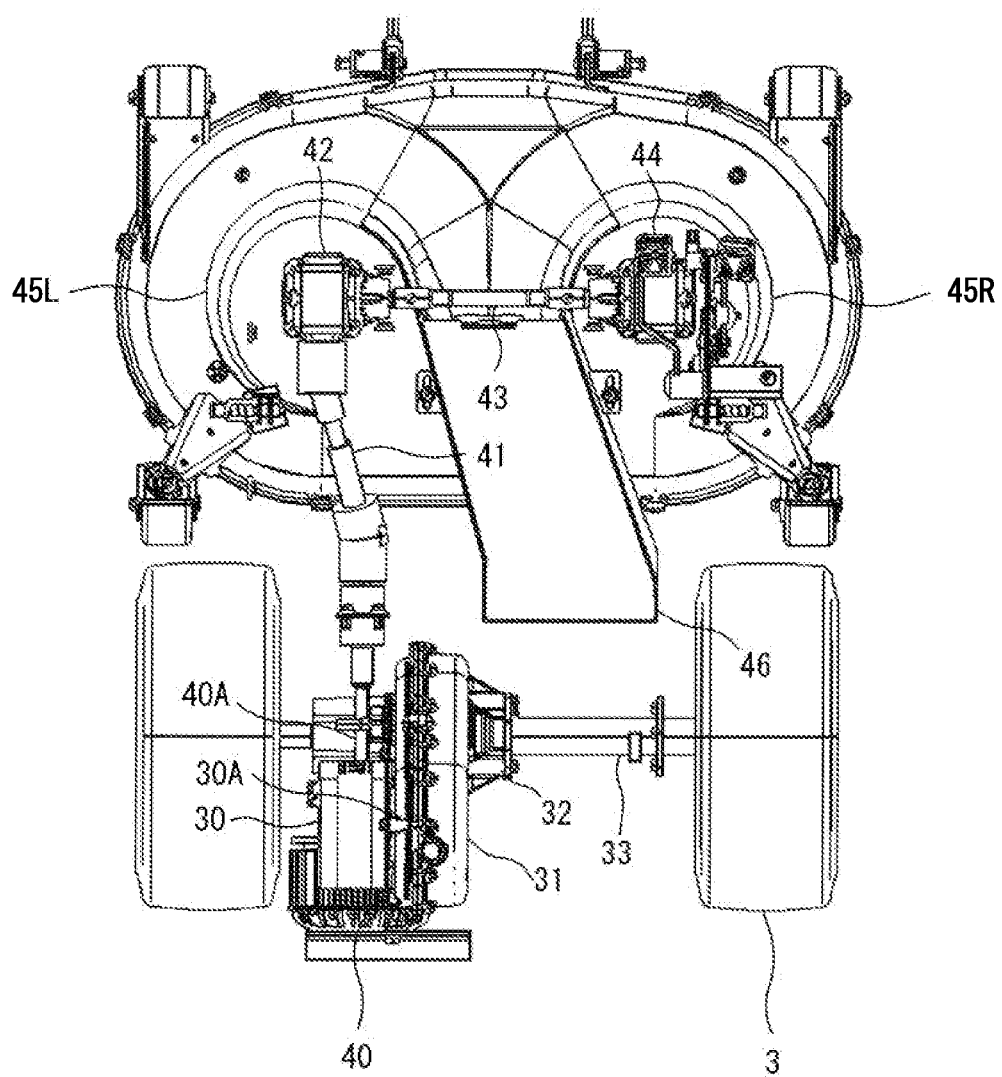
FIG. 5 is a plan view of main parts of rear wheels and a work machine.
Figure 6:
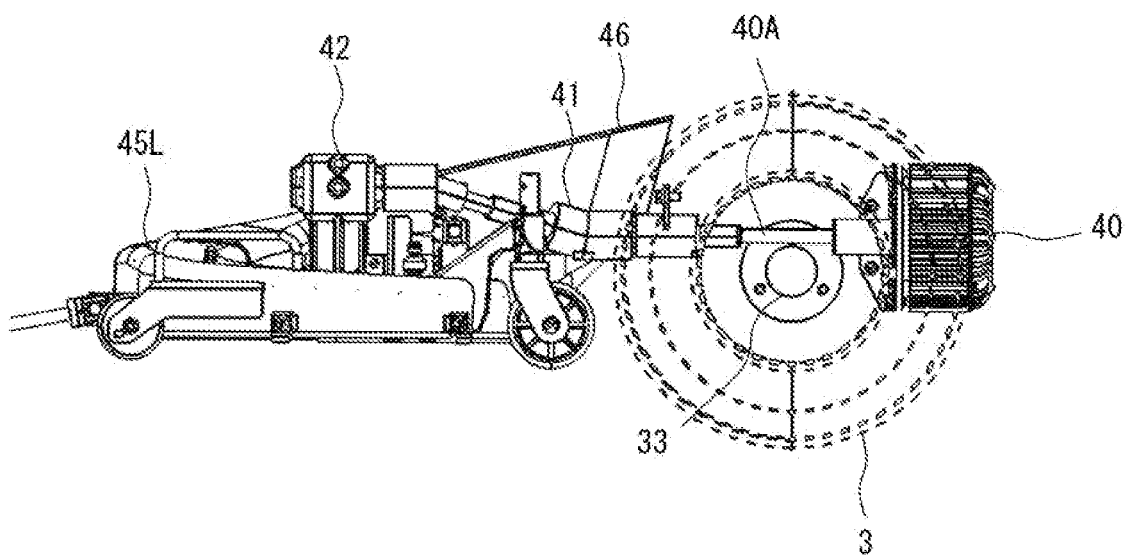
FIG. 6 is a left side view of the main parts of the rear wheels and the work machine.
Figure 7:
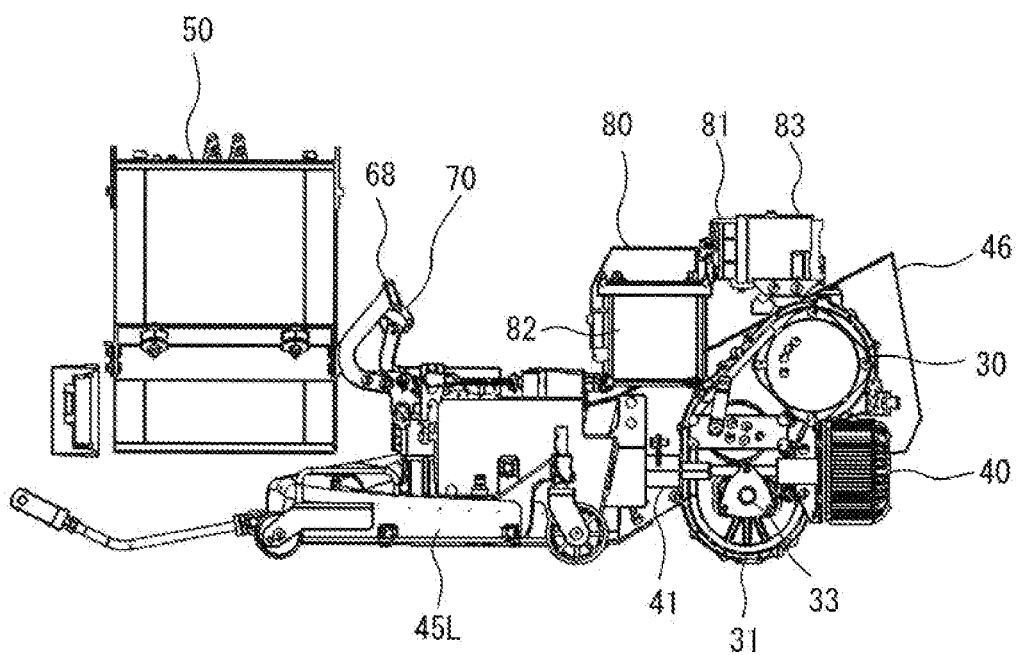
FIG. 7 is a left side view of an electric motor for the rear wheels and an electric motor for the work machine.

As shown in FIGS. 2 and 3, the hood 5 is provided with a battery 50 for storing electric power to be supplied to a first electric motor 30 and the like for driving the rear wheels 3, and the battery 50 is covered with a hood cover 51. The hood cover 51 is supported by a support shaft (not shown) provided at a front portion of the traveling vehicle body 1 and extending in a left-right direction. Accordingly, a space formed in the hood 5 can be effectively utilized, and a difference in a weight balance in a front-rear direction of the work vehicle can be prevented.

An electrical component 61 is provided on a lower side of a control seat 60 of the control portion 6. Accordingly, a space formed on the lower side of the control seat 60 can be effectively utilized.

The safety frame 8 includes a left pillar portion 8L extending in an up-down direction, a right pillar portion 8R extending in the up-down direction, and an inverted U-shaped coupling portion 8A coupling upper portions of the left pillar portion 8L and the right pillar portion 8R.

As shown in FIGS. 4 to 7, the first electric motor 30 such as a synchronous electric motor or an induction electric motor operated by a three-phase AC voltage waveform for driving the rear wheels 3 is provided below the electrical component 61. A first output shaft 30A formed to extend in the left-right direction of the first electric motor 30 is coupled to an upper portion of a gear box 31 that decelerates an output rotation transmitted from the first output shaft 30A to increase an output torque or reverse a rotation direction. The first electric motor 30 is provided at a position shifted to a left side from a center in the left-right direction.

The output rotation accelerated or decelerated by the gear box 31 is transmitted to a drive shaft 33 extending in the left-right direction via a differential gear 32 provided in a lower portion of the gear box 31 and formed by a differential gear or the like. The output rotation transmitted to the drive shaft 33 is transmitted to the rear wheels 3 supported by both end portions of the drive shaft 33.

A second electric motor 40 such as a synchronous electric motor or an induction electric motor operated by a three-phase AC voltage waveform for driving the work machine 4 is provided below the first electric motor 30. A second output shaft 40A formed to extend in the front-rear direction of the second electric motor 40 is coupled to a rear portion of a universal joint 41 provided to extend in the front-rear direction. The second output shaft 40A is provided above the drive shaft 33 so as to be orthogonal to the drive shaft 33. Accordingly, a space formed below the first electric motor 30 can be effectively utilized. Since a transmission path between the second electric motor 40 and the work machine 4 can be shortened, the output rotation of the second electric motor 40 can be efficiently transmitted to the work machine 4. The second electric motor 40 is provided at a position shifted to the left side from the center in the left-right direction.

A front portion of the universal joint 41 is coupled to a gear box 42 that decelerates an output rotation transmitted from the universal joint 41 to increase an output torque. The output rotation transmitted to the gear box 42 is transmitted to a left cutting blade (not shown) provided in a left discharge passage 45L of the work machine 4 via an output shaft formed to extend in the up-down direction of the gear box 42.

A coupling member 43 extending in the left-right direction is coupled to a right portion of the gear box 42, and a right portion of the coupling member 43 is coupled to a gear box 44. The output rotation transmitted to the gear box 44 is transmitted to a right cutting blade (not shown) provided in a right discharge passage 45R of the work machine 4 via an output shaft formed to extend in the up-down direction of the gear box 44. A rotation speed of the output rotation of the output shaft of the gear box 42 and a rotation speed of the output rotation of the output shaft of the gear box 44 are the same, and rotation directions are opposite to each other, that is, in a plan view, the output shaft of the gear box 42 rotates in a clockwise direction, and the output shaft of the gear box 44 rotates in a counterclockwise direction.

Outlet ports of the left discharge passage 45L and the right discharge passage 45R are coupled to an inlet port of a chute 46 for conveying cut lawn or the like to the grass collection container 7. An outlet port of the chute 46 is coupled to an inlet port of the grass collection container 7.

In the plan view, a front portion of the chute 46 is provided on a right side of the universal joint 41, a rear portion of the chute 46 is provided on a right side of the gear box 31. In a rear view, the chute 46 and the grass collection container 7 are provided between the gear box 31 and the right rear wheel 3. Accordingly, the large chute 46 can be provided in a space formed on the right side of the universal joint 41 and the gear box 31, and the lawn or the like mowed by the work machine 4 can be efficiently conveyed to the grass collection container 7.

In a side view, an upper wall of the chute 46 is formed to be inclined rearward and upward, and the rear portion of the chute 46 is provided to extend downward on a lower side of the electrical component 61. Accordingly, the rear portion of the chute 46 can be enlarged to prevent the inside of the chute 46 from being clogged with lawn or the like.

Figure 8:
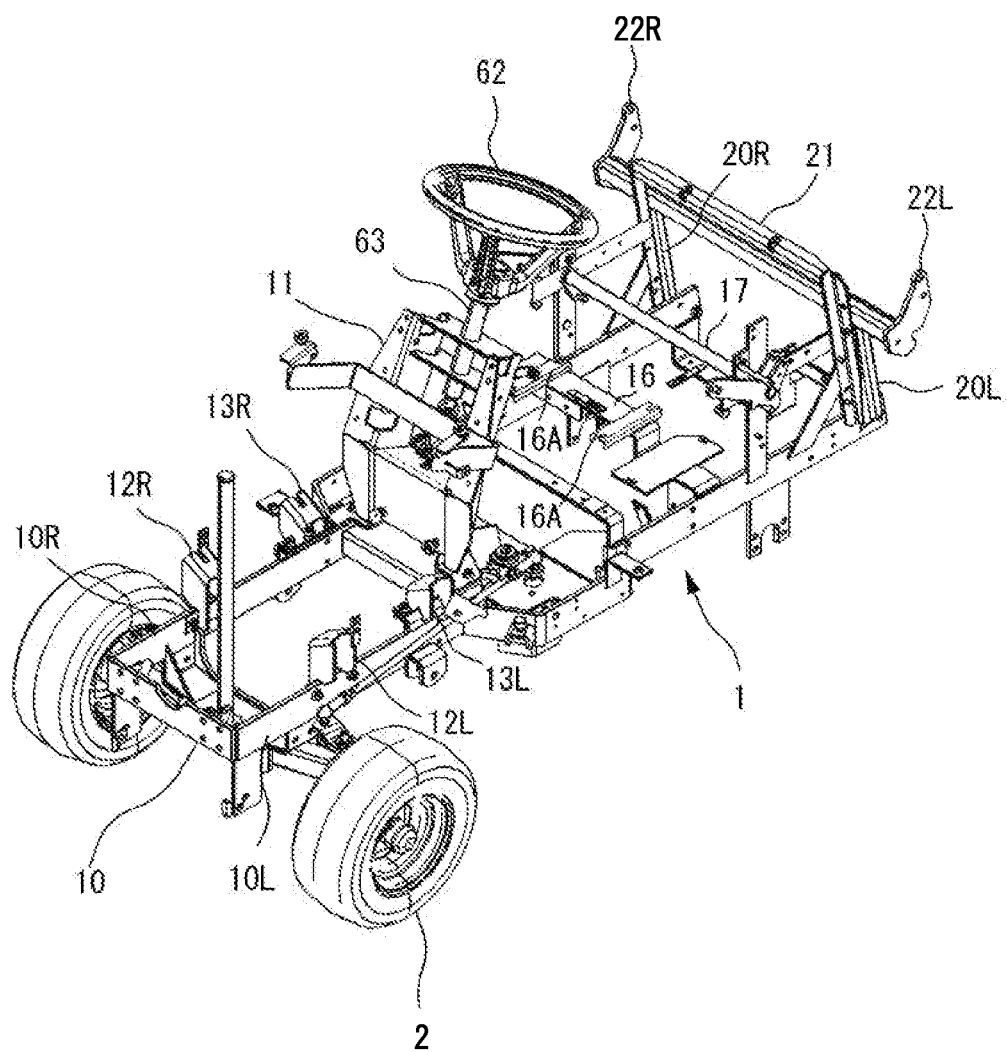
FIG. 8 is a perspective view of a traveling vehicle body.
Figure 9:
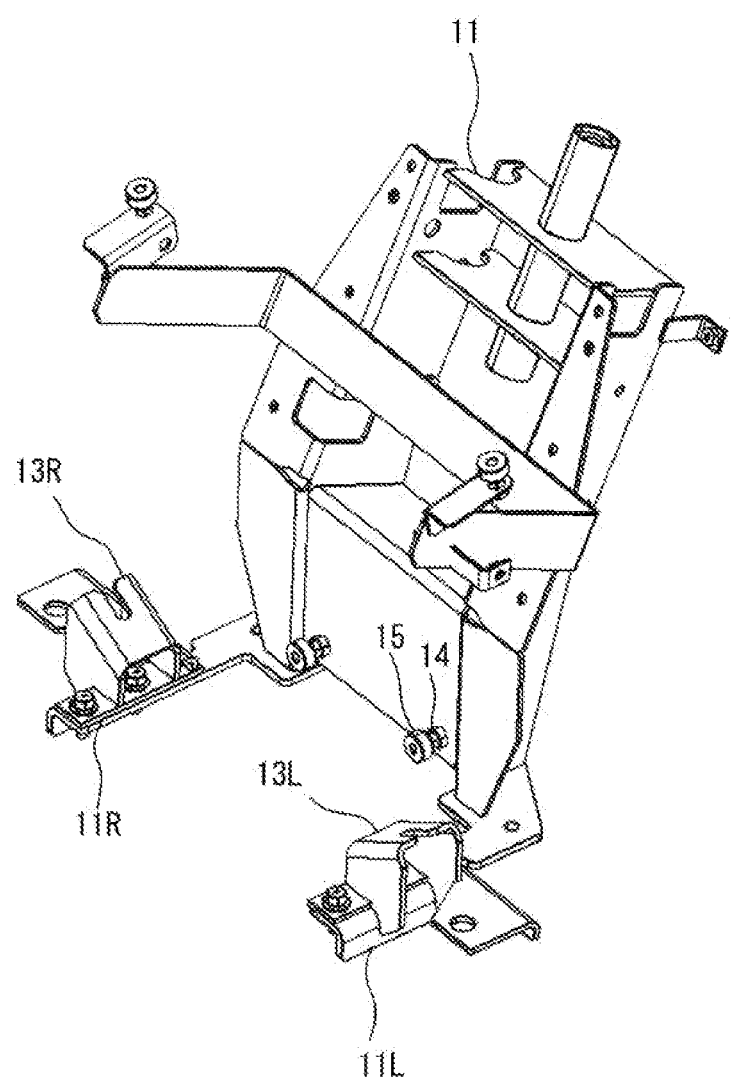
FIG. 9 is a perspective view of a steering post.

As shown in FIGS. 8 and 9, the traveling vehicle body 1 includes a traveling vehicle body main body 10 that supports the front wheels 2 and the rear wheels 3, and a steering post 11 that supports a steering shaft 63.

A left front and rear frame 10L and a right front and rear frame 10R extending in the front-rear direction are formed in the traveling vehicle body main body 10, and a left coupling portion 11L and a right coupling portion 11R extending forward are formed in a lower portion of the steering post 11.

The left coupling portion 11L is fixed to the left front and rear frame 10L by a fastening member such as bolts, and the right coupling portion 11R is fixed to the right front and rear frame 10R by a fastening member such as bolts, so that the traveling vehicle body main body 10 and the steering post 11 are integrated to form the traveling vehicle body 1.

A left support member 12L is provided at a front portion of the left front and rear frame 10L, and a coupling portion of the left support member 12L is formed to be inclined upward to the left. A right support member 12R is provided at a front portion of the right front and rear frame 10R, and a coupling portion of the right support member 12R is formed to be inclined upward to the right. The left support member 12L and the right support member 12R are formed of a channel steel material.

A left support member 13L is provided at a front portion of the left coupling portion 11L, and a coupling portion of the left support member 13L is formed to be inclined upward to the left. A right support member 13R is provided at a front portion of the right coupling portion 11R, and a coupling portion of the right support member 12R is formed to be inclined upward to the right. The left support member 13L and the right support member 13R are formed of a channel steel material.

Protruding portions 14 are formed at a lower portion of the steering post 11 so as to protrude to the front side at a predetermined interval in the left-right direction. A buffer member 15 formed of a rubber member or the like is provided at a tip end of each of the protruding portions 14.

A left up and down frame 20L extending upward is provided at a rear portion of the left front and rear frame 10L, a right up and down frame 20R extending upward is provided at a rear portion of the right front and rear frame 10R. Upper portions of the left up and down frame 20L and the right up and down frame 20R are coupled to a left and right frame 21 extending in the left-right direction.

A left coupling portion 22L to which a lower portion of the left pillar portion 8L of the safety frame 8 is coupled is provided at a left portion of the left and right frames 21. A right coupling portion 22R to which a lower portion of the right pillar portion 8R of the safety frame 8 is coupled is provided at a right portion of the left and right frame 21.

Figure 10:
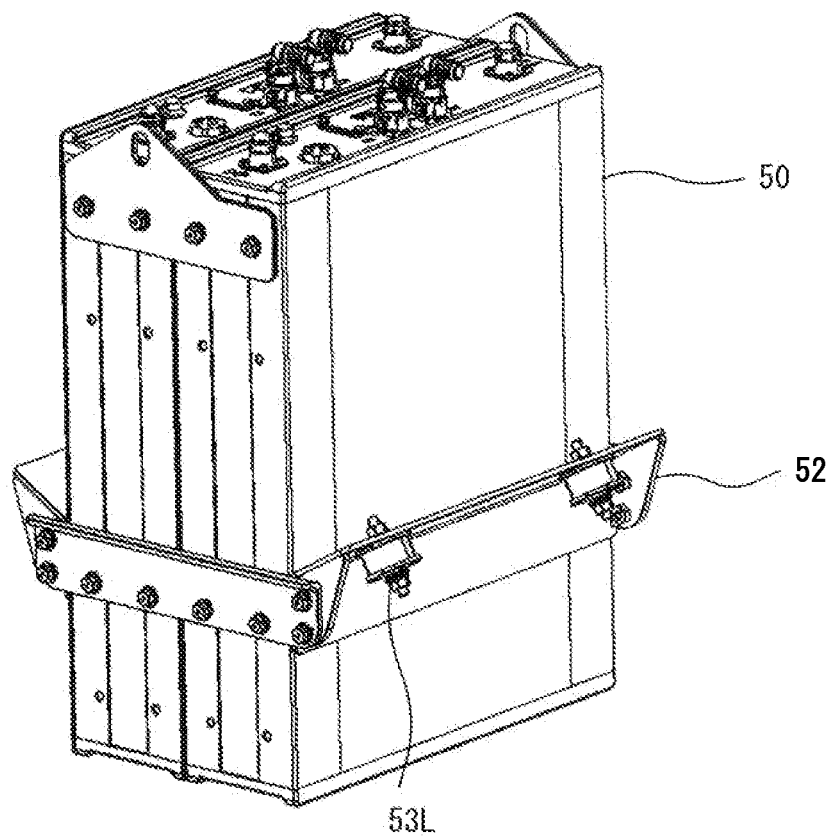
FIG. 10 is a perspective view of a battery and a battery bracket.

As shown in FIG. 10, a lower portion of the battery 50 provided in the hood 5 is fitted into an inner peripheral portion of a battery bracket 52. The battery 50 is formed by connecting a plurality of lithium ion batteries having a high energy density in series and in parallel. Accordingly, a space formed in the hood 5 can be utilized. Further, since the lithium ion battery has a high energy density, the work vehicle can travel for a long distance by one full charge.

Figure 11:
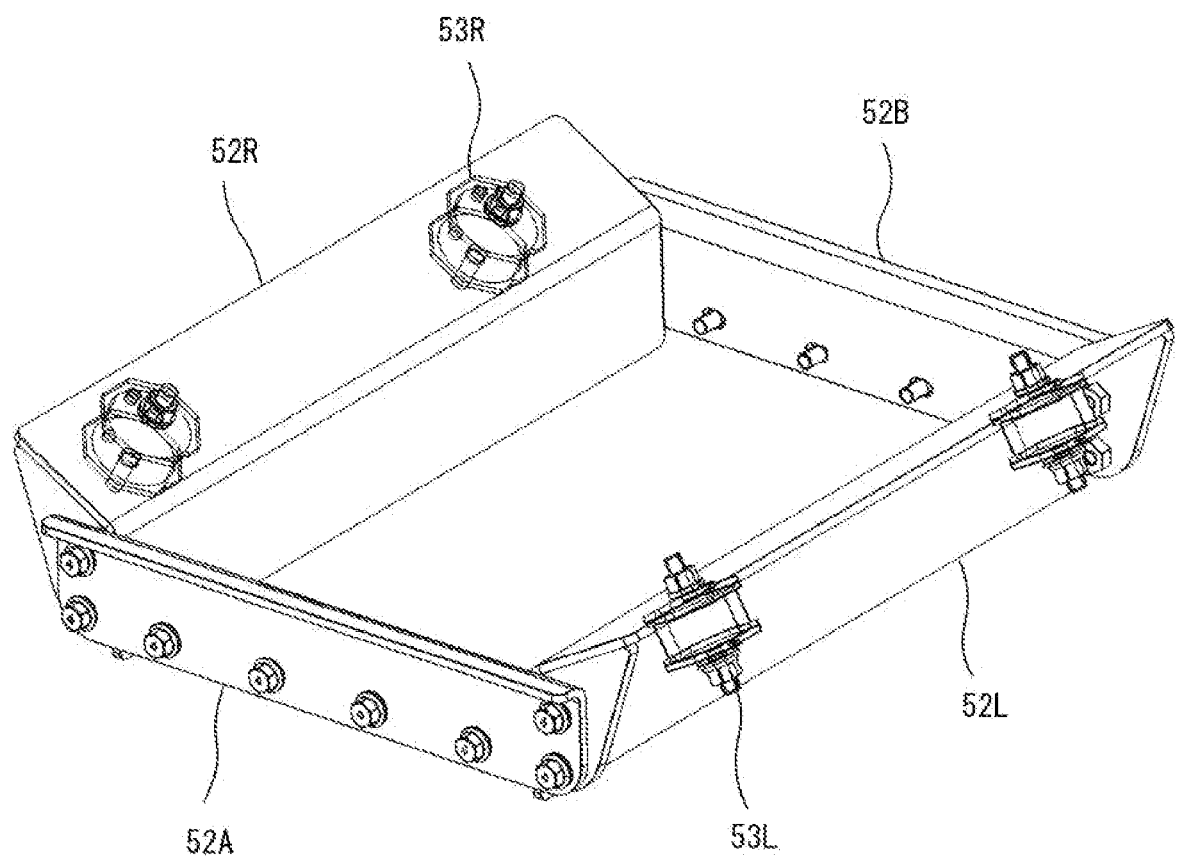
FIG. 11 is a perspective view of the battery bracket.

As shown in FIG. 11, the battery bracket 52 includes a left front and rear frame 52L and a right front and rear frame 52R extending in the front-rear direction, a front left and right frame 52A coupling front portions of the left front and rear frame 52L and the right front and rear frame 52R, and a rear left and right frame 52B coupling rear portions of the left front and rear frame 52L and the right front and rear frame 52R. The left front and rear frame 52L and the right front and rear frame 52R are formed of an angle steel material. The front left and right frame 52A and the rear left and right frame 52B are formed of a channel steel material.

A coupling portion of the left front and rear frame 52L is formed to be inclined upward to the left. A coupling portion of the right front and rear frame 52R is formed to be inclined upward to the right. In the rear view, the coupling portion of the left support member 13L, the coupling portion of the left support member 12L, and the coupling portion of the left front and rear frame 52L are inclined upward to the left at the same inclination angle. The coupling portion of the right support member 13R, the coupling portion of the right support member 12R, and the coupling portion of the right front and rear frame 52R are inclined upward to the right at the same inclination angle.

Circular left vibration isolating members 53L are provided on a lower surface of the coupling portion of the left front and rear frame 52L at a predetermined interval in the front-rear direction. Circular right vibration isolating members 53R are provided on a lower surface of the coupling portion of the right front and rear frame 52R at a predetermined interval in the front-rear direction.

The left front and rear frame 52L is coupled to the left support member 12L of the left front and rear frame 10L and the left support member 13L of the left coupling portion 11L via the left vibration isolating members 53L. The right front and rear frame 52R is coupled to the right support member 12R of the right front and rear frame 10R and the right support member 13R of the right coupling portion 11R via the right vibration isolating members 53R. Accordingly, it is possible to prevent the vibration of the traveling vehicle body main body 10 generated during traveling of the work vehicle from being transmitted to the battery 50, and it is possible to prevent damage or the like on the battery 50.

Figure 12:
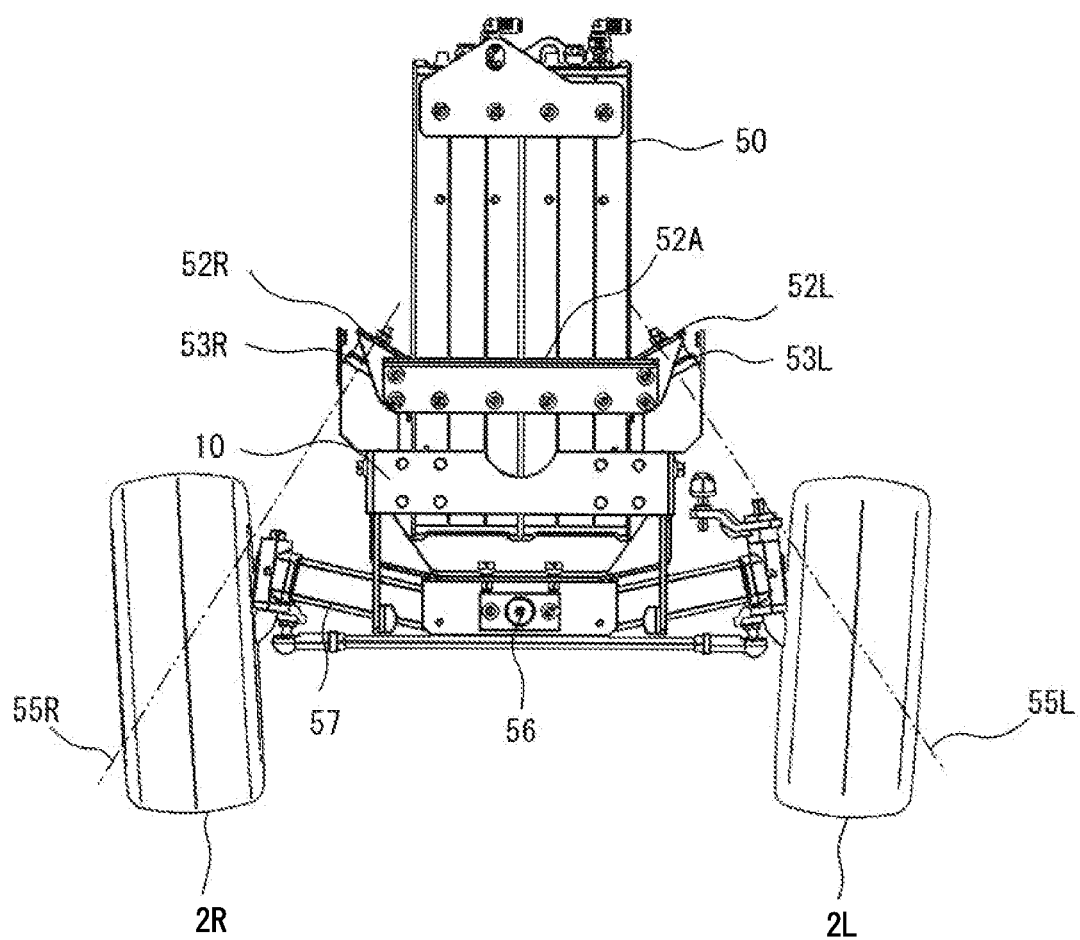
FIG. 12 is a front view of front wheels, the battery, and the battery bracket.

As shown in FIG. 12, the coupling portion of the left front and rear frame 52L is provided perpendicular to a left imaginary line 55L connecting a center of the left vibration isolating member 53L and a center of the left front wheel 2L. The coupling portion of the right front and rear frame 52R is provided perpendicular to a right imaginary line 55R connecting a center of the right vibration isolating member 53R and a center of the right front wheel 2R. Accordingly, it is possible to prevent large vibration caused by unevenness of a traveling surface via the front wheels 2 and the rear wheels 3, and to prevent damage or the like on the battery 50. A reference numeral 57 denotes a front wheel support frame that supports the left and right front wheels 2. A reference numeral 56 denotes a coupling portion between the front wheel support frame and the traveling vehicle body main body 10, and denotes a swing shaft of the front wheel support frame.

Tip end portions of the buffer members 15 of the steering post 11 are pressed against a rear surface of the rear left and right frames 52B of the battery bracket 52. Accordingly, it is possible to prevent a rearward movement of the battery 50 at the time of starting the work vehicle, and to prevent damage or the like on the battery 50.

Figure 13:
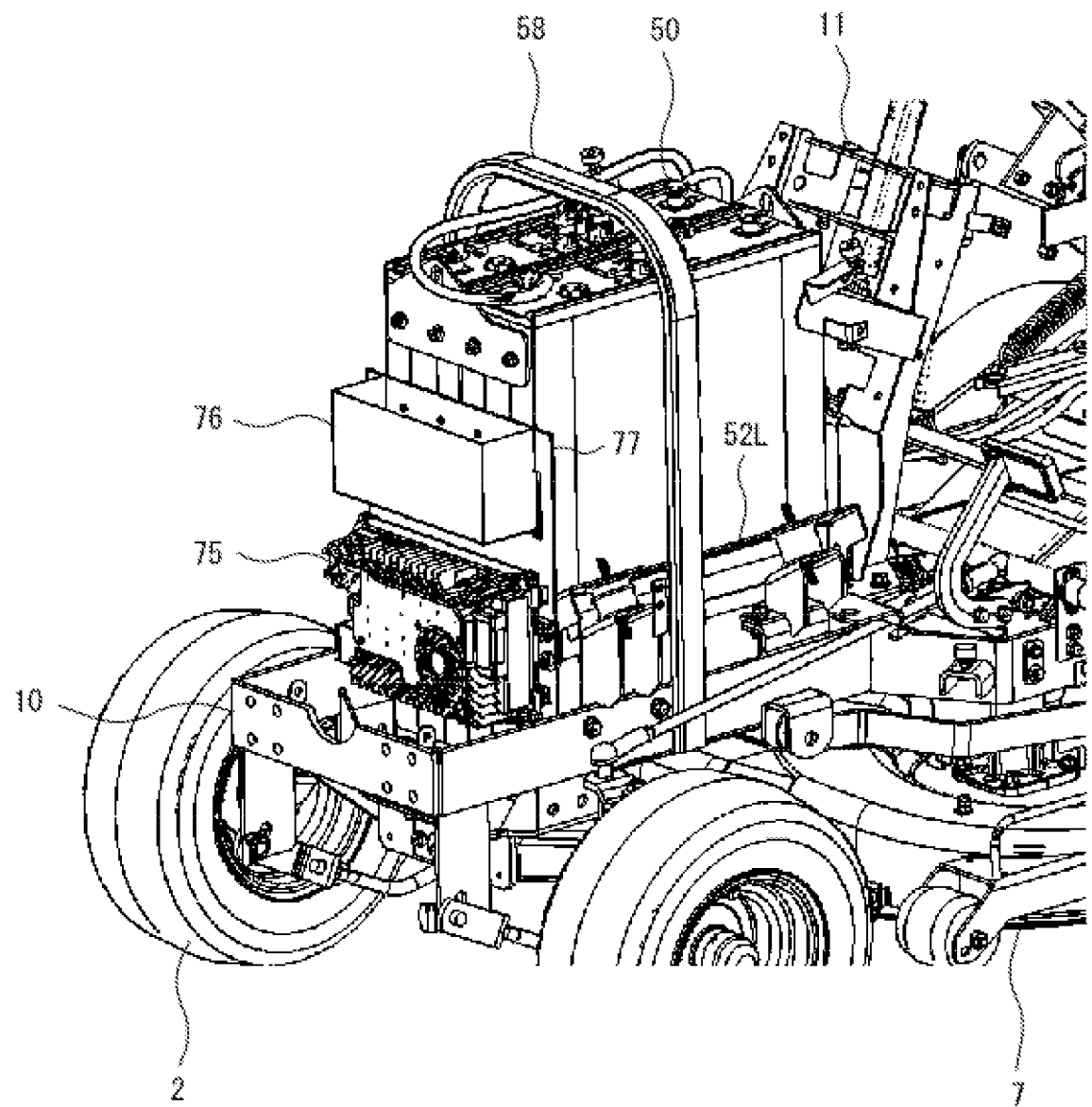
FIG. 13 is a perspective view of a charger and a storage case that stores a charging cable which are provided on a front side of the battery.

As shown in FIG. 13, a battery charger 75 for the battery 50 and a storage case 76 for storing a charging cable 78 are provided on a front side of the battery 50. Accordingly, when a charge amount of the battery 50 is equal to or less than a predetermined value, the work vehicle can be moved to a nearby warehouse or the like without being moved to a charging station, and the battery 50 can be charged by connecting a household outlet provided in a warehouse or the like and the charger 75 by the charging cable 78. An input voltage of the charger 75 is formed so as to correspond to an AC voltage of 100 to 240 V.

Figure 14:
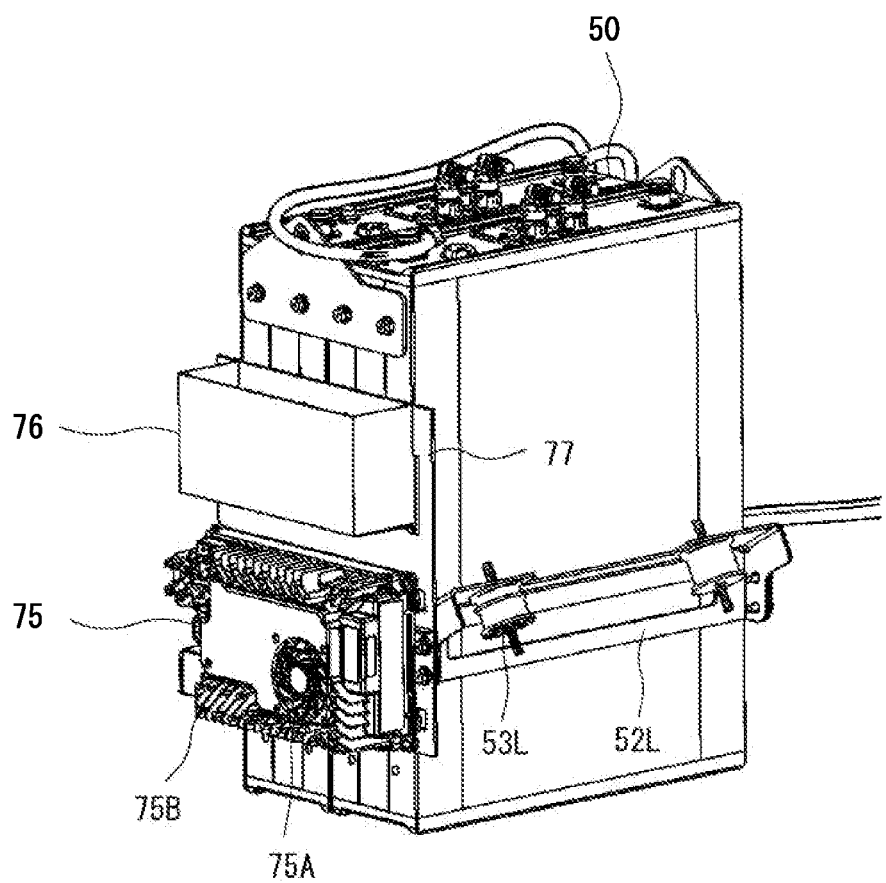
FIG. 14 is a perspective view of main parts of FIG. 13.

As shown in FIG. 14, the charger 75 is provided at a lower portion of a front surface of a rectangular support member 77 detachably provided to the front left and right frame 52A of the battery bracket 52 by a fastening member such as bolts. The storage case 76 is provided at an upper portion of the front surface of the support member 77. Accordingly, after the hood cover 51 is opened, the charging cable 78 having one end connected to the household outlet can be inserted from a lower side to an upper side in a space defined by the traveling vehicle body main body 10 and the charger 75, and the other end of the charging cable 78 can be connected to the charger 75. Therefore, a charging operation can be performed without moving the work vehicle to the vicinity of the household outlet.

A fan 75A is formed on a left front portion of the charger 75, and a plurality of fins 75B are formed on an outer peripheral portion of the charger 75. Accordingly, heat generated during charging of the charger 75 can be efficiently released to an outside, and temperature rise of the charger 75 during the charging can be reduced.

Figure 15:
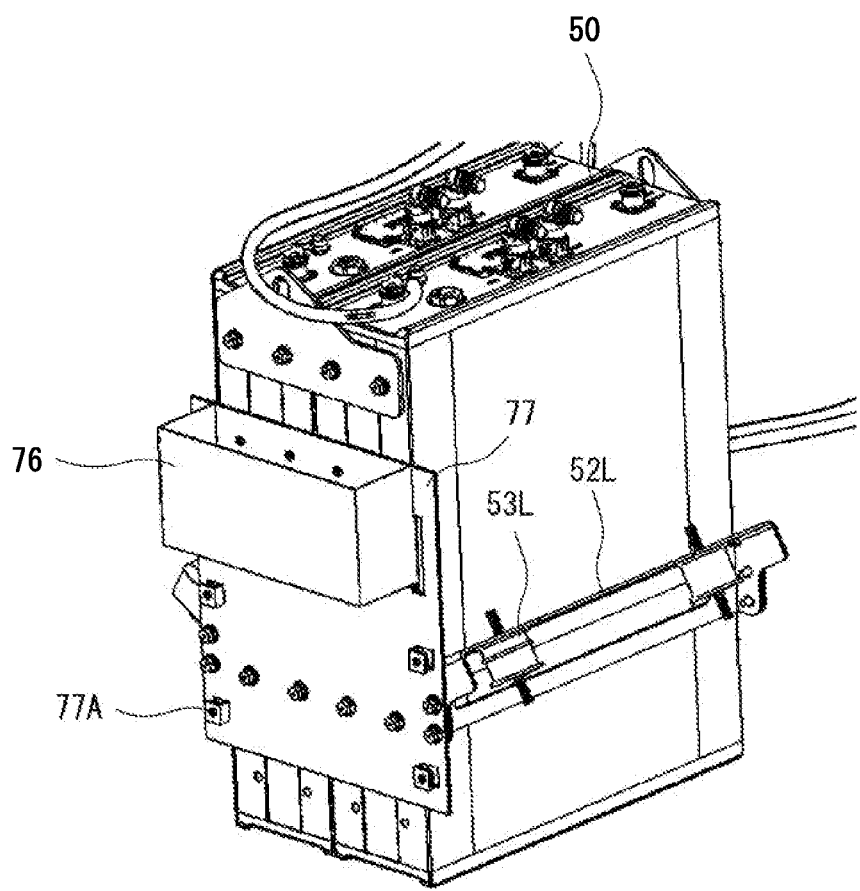
FIG. 15 is a perspective view of a plate on which the charger and the storage case are mounted.
Figure 16:
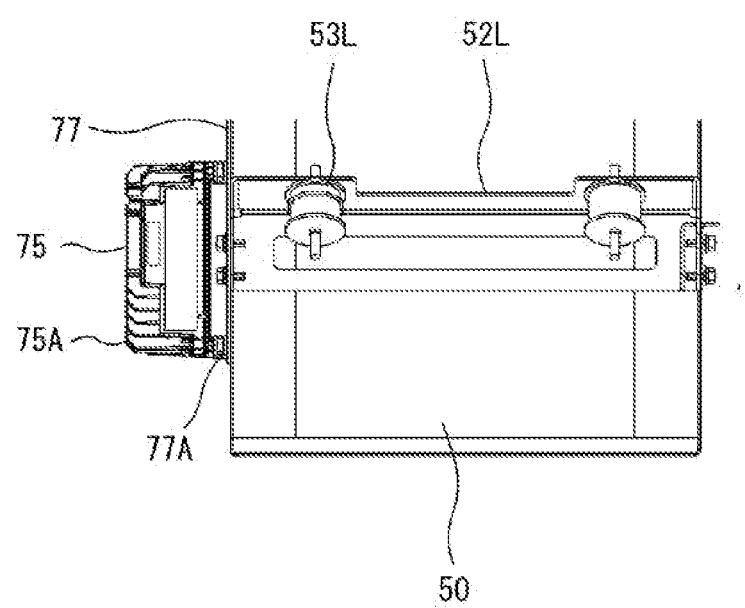
FIG. 16 is a left side view of the main parts of the battery and the charger.

As shown in FIGS. 15 and 16, a rear surface of the charger 75 is mounted on the support member 77 via extending portions 77A formed in a lower portion of the front surface of the support member 77 and extending forward. Accordingly, a space is formed between the charger 75 and the support member 77, the heat generated during the charging of the charger 75 can be more efficiently released to the outside, and the temperature rise of the charger 75 during the charging can be further reduced. The support member 77 is preferably formed of a member in which a plurality of openings are formed, such as punching metal.

Figure 17:
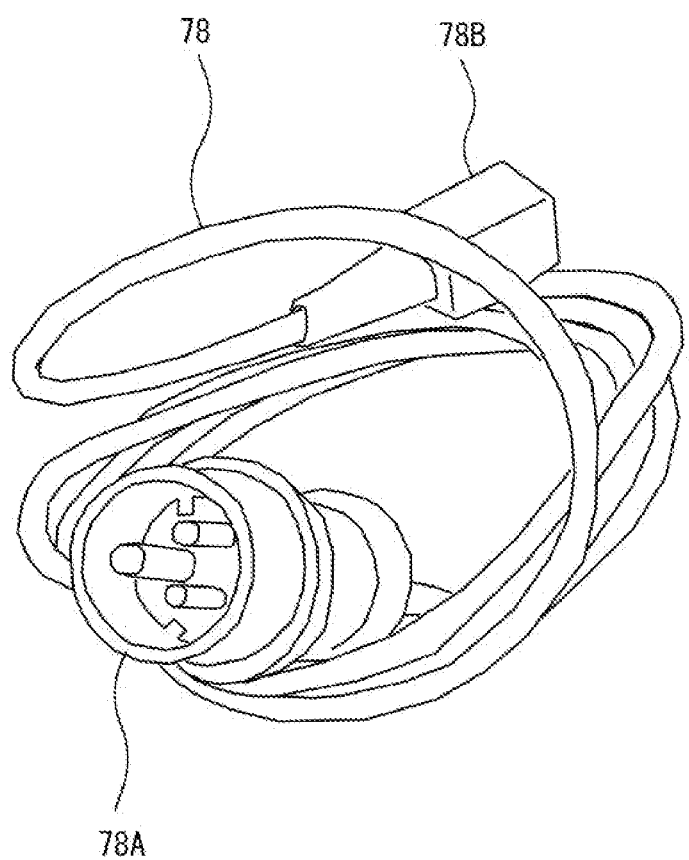
FIG. 17 is a perspective view of the charging cable.

As shown in FIG. 17, a plug 78A to be connected to the household outlet is formed at one end of the charging cable 78, and a plug 78B to be connected to a connection terminal of the charger 75 is formed at the other end of the charging cable 78.

Figure 18:
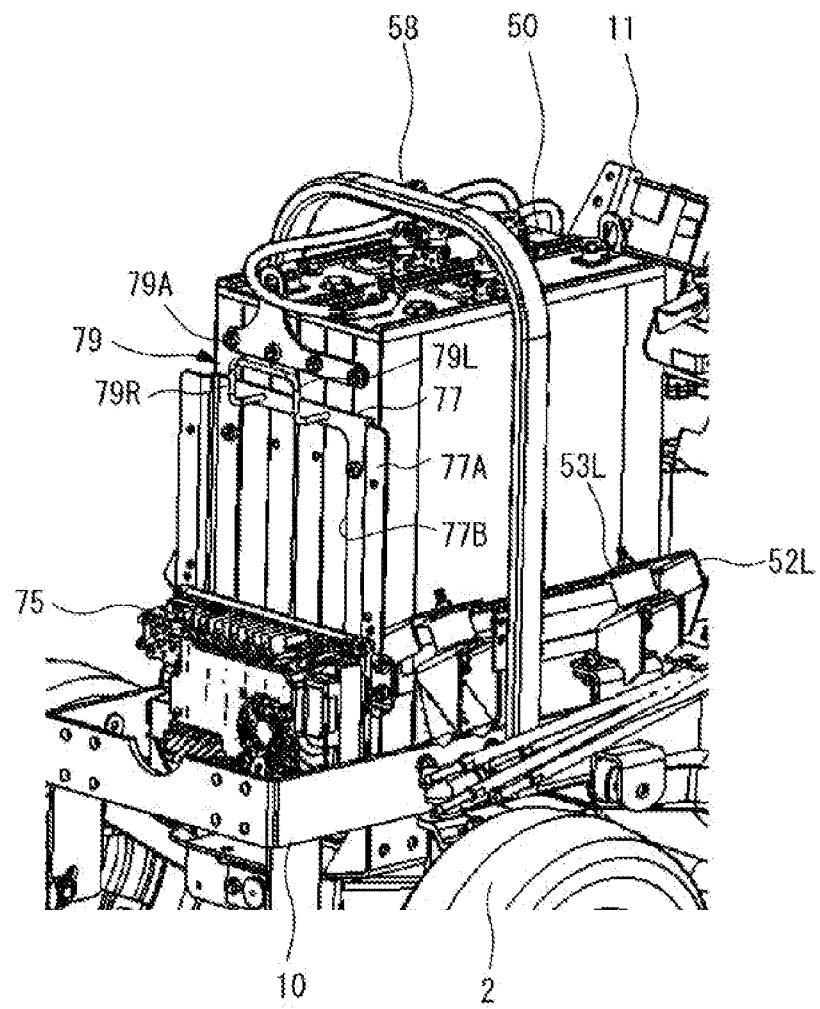
FIG. 18 is a perspective view of the charger and a hook for locking the charging cable which are provided on the front side of the battery.

As shown in FIG. 18, instead of the storage case 76 for storing the charging cable 78, a hook 79 for locking the charging cable 78 may be provided on an upper portion of the support member 77. Accordingly, a large opening 77B is formed between the hook 79 and the charger 75 in the support member 77, air is blown toward the front portion of the battery 50, and the temperature rise of the battery 50 during the charging and discharging can be reduced. The rear surface of the charger 75 is mounted on the support member 77 via the extending portions 77A which are formed at left and right ends of the support member 77 and extend forward, and a large space is formed on an upper side of the charger 75. When the hood cover 51 is opened, external air is efficiently blown toward the charger 75, and the temperature rise of the charger 75 during the charging can be further reduced.

The hook 79 includes a left round bar portion 79L that extends forward from the front surface of the support member 77 and then extends upward, a right round bar portion 79R that extends forward from the front surface of the support member 77 and then extends upward, and a left and right round bar portion 79A that couples upper portions of the left round bar portion 79L and the right round bar portion 79R and extends in the left-right direction.

Figure 19:
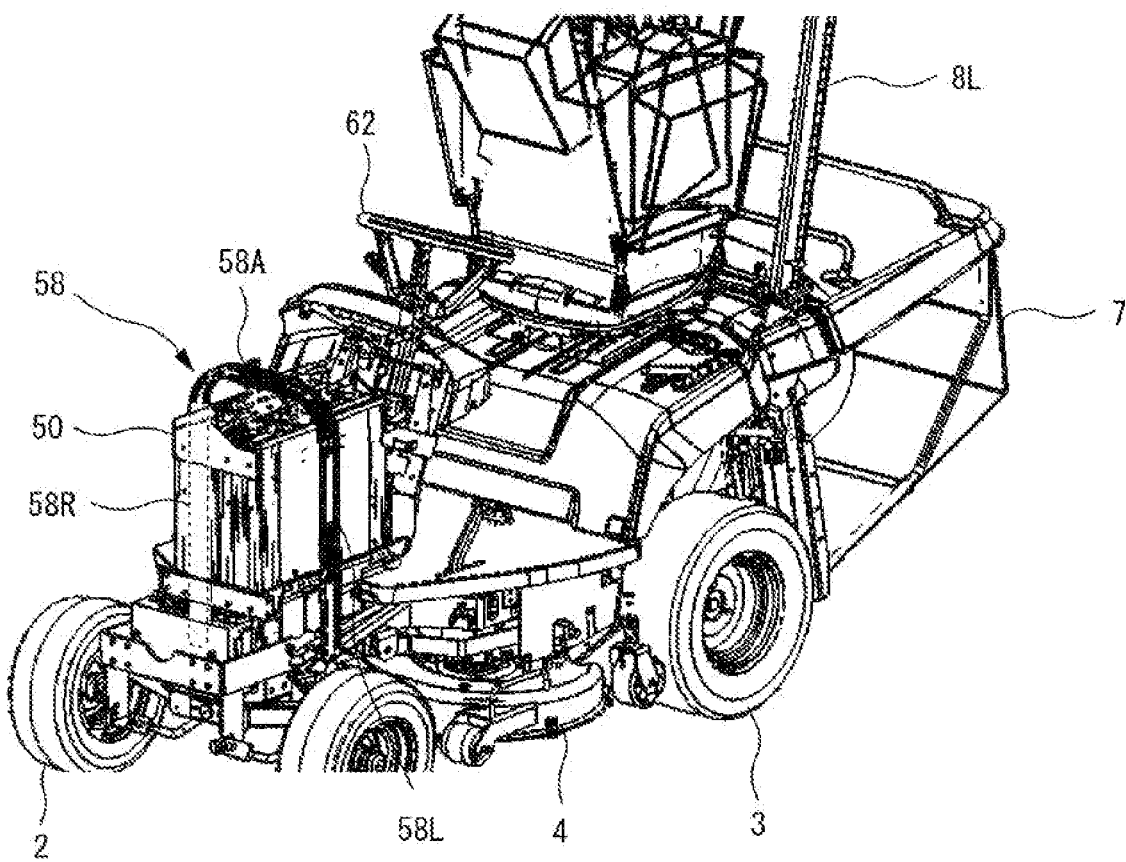
FIG. 19 is a perspective view of a protection frame of the battery.
Figure 20:
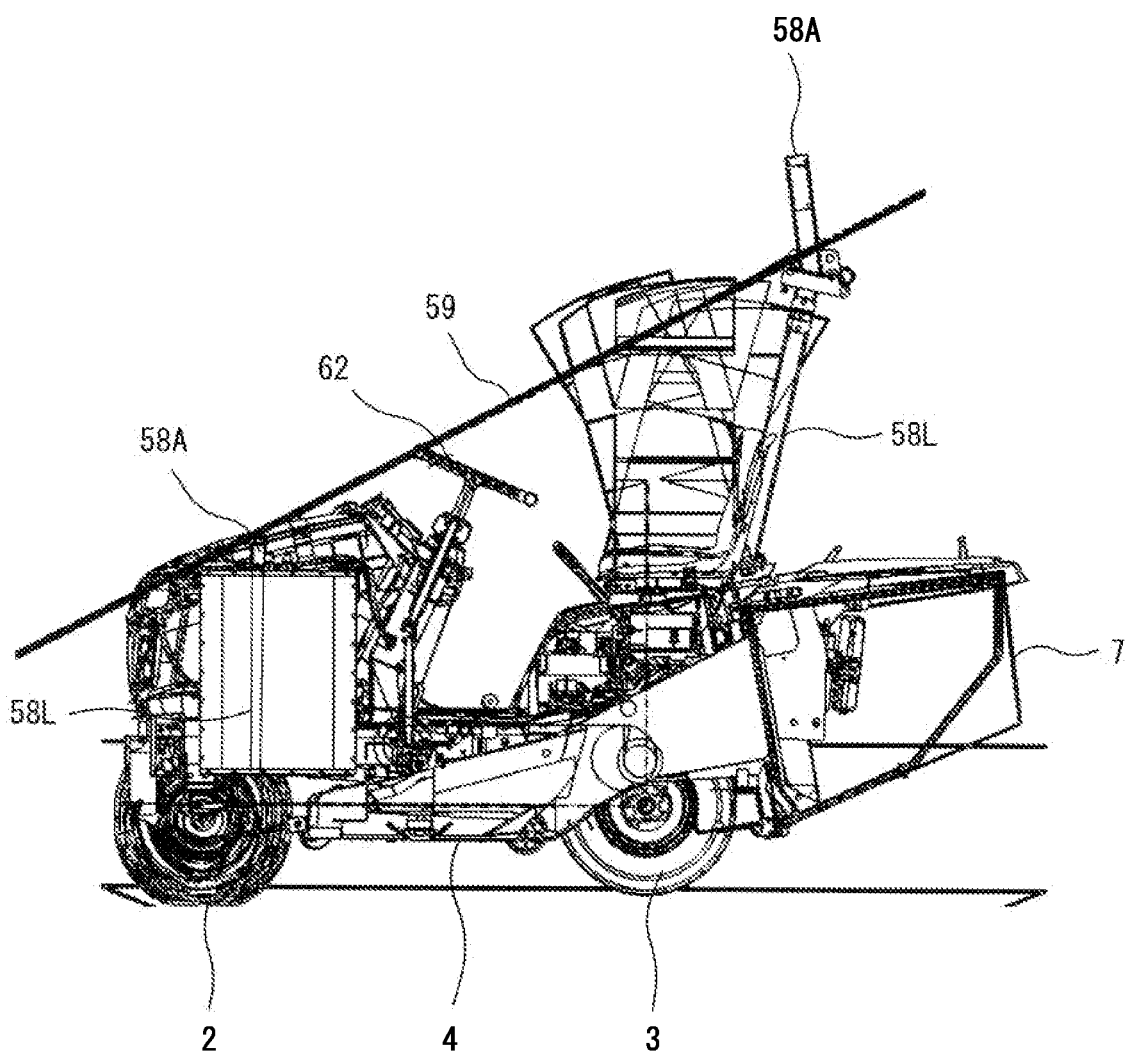
FIG. 20 is an explanatory view of a protection space formed by the protection frame and a safety frame.

As shown in FIGS. 19 and 20, a protection frame 58 extending along an outer peripheral portion of the battery 50 is provided at an intermediate portion of the battery 50 in the front-rear direction. Accordingly, it is possible to prevent the battery 50 from being damaged when the work vehicle falls down.

The protection frame 58 includes a left pillar portion 58L extending upward from the left front and rear frame 10L, a right pillar portion 58R extending upward from the right front and rear frame 10R, and an inverted U-shaped coupling portion ("second coupling portion") 58A coupling upper portions of the left pillar portion 58L and the right pillar portion 58R.

In the side view, an imaginary line ("third imaginary line") 59 coupling a base portion of the coupling portion 58A of the protection frame 58 and a top portion of the coupling portion ("first coupling portion") 8A of the safety frame 8 is formed so as to be positioned above a steering wheel 62. Accordingly, a large protection space is formed below the imaginary line 59, and it is possible to prevent the operator from colliding with a branch or the like of an external tree when the work vehicle is traveling, thereby improving work safety.

As shown in FIGS. 2 and 3, the steering wheel 62 is provided on a front side of the control seat 60 of the control portion 6, and the steering wheel 62 is supported by an upper portion of the steering shaft 63 extending in the up-down direction.

A left fender 64L on a left side of the control seat 60 is provided with a cleaner lever 65 for operating, for example, conveying mowed grass remaining in the chute 46 to the grass collection container 7 on the rear side. A right fender 64R on a right side of the control seat 60 is provided with an operation lever 66 for operating an up and down movement of the work machine 4. Further, a brake pedal 68 is provided at a left front portion of a floor 67 on which an operator places his/her feet at the time of steering, and a forward accelerator pedal 70 and a reverse accelerator pedal 71 are provided side by side at a right front portion of the floor 67.

Figure 21:
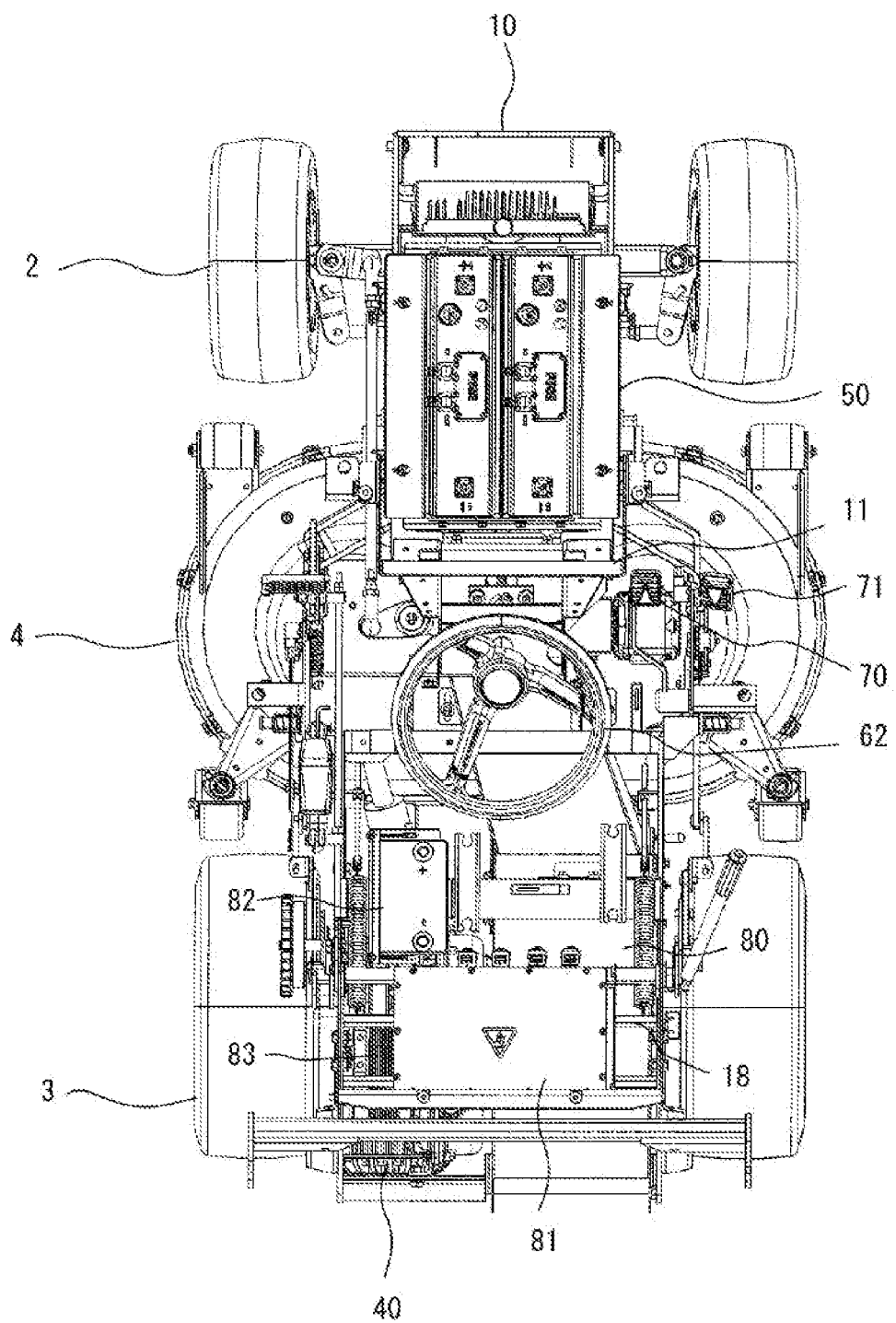
FIG. 21 is a plan view of main parts of the work vehicle in which a part of the work vehicle is cut away.

As shown in FIG. 21, the electrical component 61 provided in a space formed between the chute 46 of the work machine 4 and the control seat 60 includes an inverter device 80 that converts a DC voltage supplied from the battery 50 into an AC voltage to generate a three-phase AC voltage waveform for operating the first electric motor 30 and the like, a battery monitoring device 81 that monitors a temperature, a charging state, a voltage protection, and each cell short circuit state of the battery 50, an auxiliary battery 82 such as a lead storage battery that stores a battery to be supplied to a meter panel (not shown) that is provided on a front side of the control seat 60 and displays a traveling speed and the like, and a converter device 83 that changes the DC voltage supplied from the battery 50 to a DC voltage to be supplied to a sensor that detects an operation position of the cleaner lever 65 and the like.

What is claimed is:

1. A work vehicle comprising:
    a pair of left and right front wheels provided at a front portion of a traveling vehicle body;
    a pair of left and right rear wheels provided at a rear portion of the traveling vehicle body; and
    a work machine provided on a lower surface of the traveling vehicle body, wherein
    a hood is provided at the front portion of the traveling vehicle body, and a control portion on which an operator rides is provided at a rear side of the hood,
    a first electric motor configured to drive the rear wheels and a second electric motor configured to drive the work machine are provided on a lower rear side of a control seat of the control portion, and
    a battery configured to store electric power supplied to the first electric motor and the second electric motor is provided in a space formed by the hood, wherein a first output shaft of the first electric motor is provided along a left-right direction, and a second output shaft of the second electric motor is provided along a front-rear direction,
    a gear box configured to transmit an output rotation of the first output shaft to a lower drive shaft is provided on one side of the first electric motor,
    the rear wheels and the gear box are coupled by the drive shaft, and the second electric motor is provided below the first electric motor, and
    the second output shaft is provided above the drive shaft.
2. The work vehicle according to claim 1, wherein
    the second electric motor is provided below the first electric motor, and
    the second output shaft is provided above the drive shaft so as to intersect with the drive shaft in a plan view.
3. The work vehicle according to claim 1, wherein
    a grass collection container configured to store weeds cut by the work machine is provided on a rear side of the control portion, and an outlet port of the work machine and an inlet port of the grass collection container are communicated with each other by a chute,
    the first electric motor and the second electric motor are provided so as to be shifted to one side in a left-right direction, and
    the chute is provided on the other side of the first electric motor and the second electric motor.

* * * * *

UNITED STATES PATENT AND TRADEMARK OFFICE
CERTIFICATE OF CORRECTION

Page 1 of 1

| | |
|---|---|
| PATENT NO. | : 12,457,927 B2 |
| APPLICATION NO. | : 17/820158 |
| DATED | : November 4, 2025 |
| INVENTOR(S) | : Taro Tsunashima et al. |

It is certified that error appears in the above-identified patent and that said Letters Patent is hereby corrected as shown below:

On the Title Page

After Item (65), the "Prior Publication Data," and before Item (51), the "Int. Cl." Data, insert the following missing Foreign Application Priority Data:
--(30) Foreign Application Priority Data
Aug. 17, 2021  (JP) ....................................2021-132620
Aug. 17, 2021  (JP) ....................................2021-132621
Oct. 13, 2021  (JP) ....................................2021-167944--.

Signed and Sealed this
Ninth Day of December, 2025

John A. Squires
*Director of the United States Patent and Trademark Office*